US009264778B2

(12) United States Patent
Kandanala et al.

(10) Patent No.: US 9,264,778 B2
(45) Date of Patent: *Feb. 16, 2016

(54) INTELLIGENT OFFER GENERATION

(75) Inventors: Venket S. Kandanala, Highland Village, TX (US); Nicky Pinakin Joshi, Flower Mound, TX (US); Lisa A. Caputo, Dade City, FL (US); Karthik Srinivasan, Flower Mound, TX (US); Mousumi Dasgupta, Irving, TX (US); Anand N. Sankaran, MGR Nagar (IN); Rajesh Narayanan, Virugambakkam (IN); Jubish C. Parambath, Madipakkam (IN); Mareeswari Muthusamy, Tamil Nadu (IN); VijayPrabhu Baskaran, Tamil Nadu (IN)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 125 days.

This patent is subject to a terminal disclaimer.

(21) Appl. No.: 12/966,050

(22) Filed: Dec. 13, 2010

(65) Prior Publication Data

US 2012/0151514 A1 Jun. 14, 2012

(51) Int. Cl.
| | |
|---|---|
| G06F 3/048 | (2013.01) |
| H04N 5/445 | (2011.01) |
| H04N 21/482 | (2011.01) |
| H04N 21/431 | (2011.01) |
| H04N 21/478 | (2011.01) |
| G06Q 30/02 | (2012.01) |

(52) U.S. Cl.
CPC ............. *H04N 21/482* (2013.01); *G06Q 30/02* (2013.01); *H04N 5/44543* (2013.01); *H04N 21/4314* (2013.01); *H04N 21/47815* (2013.01); *H04N 2005/44556* (2013.01); *H04N 2005/44578* (2013.01)

(58) Field of Classification Search
CPC .................... H04N 21/2542; H04N 21/47815
USPC ............................................... 725/34, 40, 60
See application file for complete search history.

(56) References Cited

U.S. PATENT DOCUMENTS

| | | | | |
|---|---|---|---|---|
| 6,029,195 | A * | 2/2000 | Herz | 725/116 |
| 6,718,553 | B2 * | 4/2004 | Kenworthy | 725/118 |
| 7,069,576 | B1 * | 6/2006 | Knudson et al. | 725/105 |
| 7,596,797 | B1 * | 9/2009 | Kapner et al. | 725/46 |
| 7,856,646 | B1 * | 12/2010 | Groff et al. | 725/42 |
| 2002/0013944 | A1 * | 1/2002 | Gordon et al. | 725/39 |
| 2004/0136698 | A1 * | 7/2004 | Mock | 386/123 |
| 2005/0090235 | A1 * | 4/2005 | Vermola et al. | 455/414.3 |
| 2005/0138653 | A1 * | 6/2005 | Littrell | 725/23 |
| 2005/0165596 | A1 * | 7/2005 | Adar et al. | 703/22 |
| 2007/0061860 | A1 * | 3/2007 | Walker et al. | 725/117 |

(Continued)

*Primary Examiner* — Benjamin R Bruckart
*Assistant Examiner* — Carmine Malangone

(57) ABSTRACT

A method may include receiving a user request to view a channel to which the user does not currently subscribe. Customer information regarding the user and marketing rules regarding a plurality of combination offers that include the channel may be obtained. A number of combination offers from the plurality of combination offers may be determined based on the customer information and the marketing rules. One or more of the determined combination offers may be provided to the user. A user request to purchase a selected one of the provided combination offers may be received. The channels included within the selected combination offer may be provisioned based on the user request.

20 Claims, 10 Drawing Sheets

(56) References Cited

U.S. PATENT DOCUMENTS

| | | | |
|---|---|---|---|
| 2008/0133345 A1* | 6/2008 | Cordery et al. | 705/14 |
| 2008/0184289 A1* | 7/2008 | Cristofalo et al. | 725/34 |
| 2009/0030796 A1* | 1/2009 | Snyder | 705/14 |
| 2010/0043037 A1* | 2/2010 | Beyabani et al. | 725/100 |
| 2010/0161375 A1* | 6/2010 | Lloyd et al. | 705/10 |
| 2010/0175092 A1* | 7/2010 | Kikinis et al. | 725/61 |
| 2010/0229123 A1* | 9/2010 | Lloyd et al. | 715/826 |

* cited by examiner

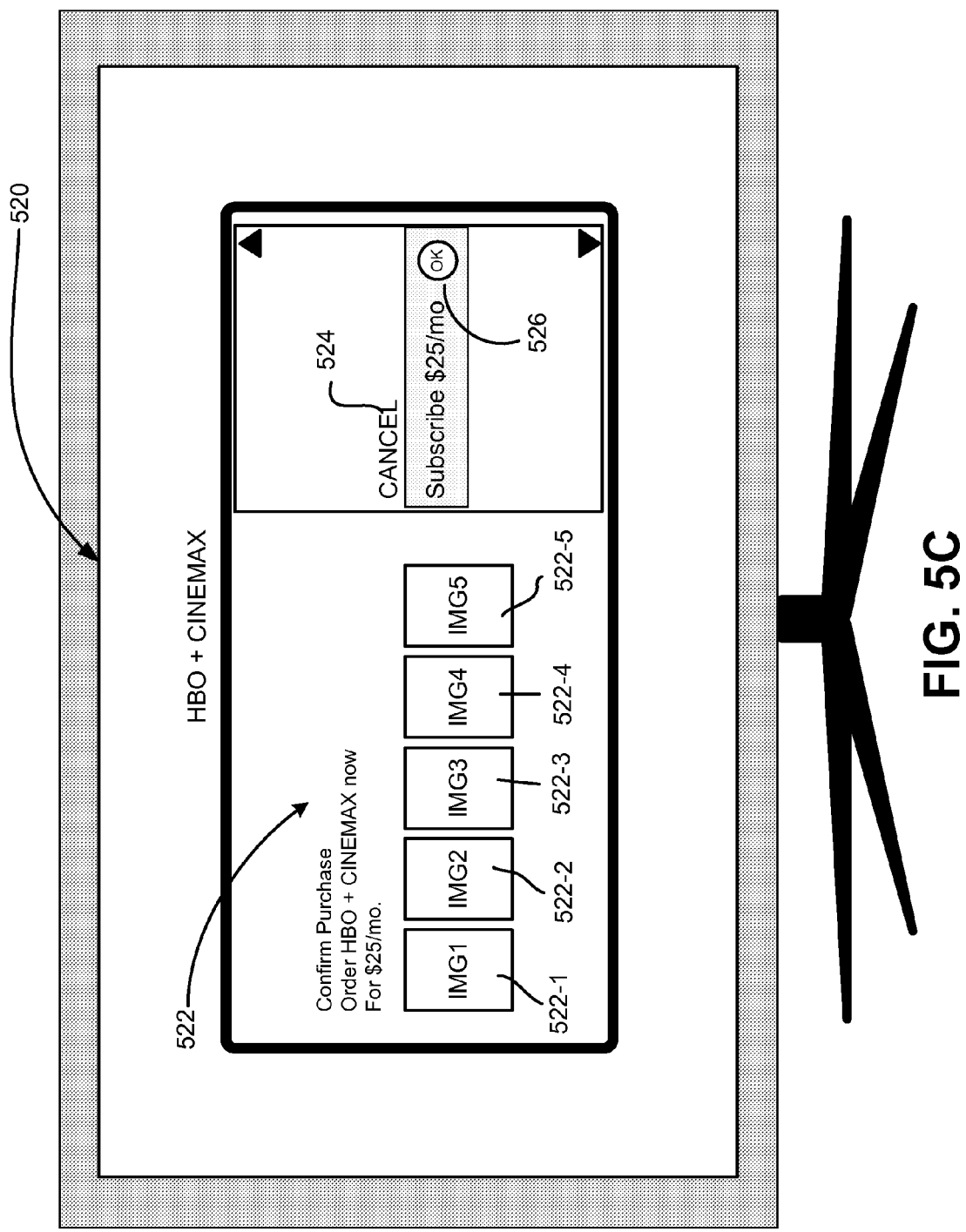

//INTELLIGENT OFFER GENERATION

BACKGROUND INFORMATION

Television viewers have access to an ever-growing amount and variety of content. Examples include broadcast television content and non-broadcast television content (often referred to as "cable" television content). Examples of cable television content may include pay movie channels, regional and national sports channels, foreign language channels, etc. Viewers may subscribe to desired non-broadcast content by communicating with their television provider.

BRIEF DESCRIPTION OF THE DRAWINGS

FIGS. 5A-5C illustrate exemplary graphical user interfaces for providing intelligent combo offers consistent with implementations described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Implementations described herein relate to devices, methods, and systems for generating video content subscription offers and for allowing users to self-provision video service based on the generated offers. Consistent with embodiments described herein, highly granular subscription offers may be generated based on various types of information associated with a customer, such as current subscription level, viewing history, geographic location, customer demographics, etc. One or more generated offers may be presented to a subscriber in an enhanced visual format for review/selection. Once an offer is selected, systems consistent with implementations described herein may provision the components (e.g., channels) included within the selected offer.

Figure 1:
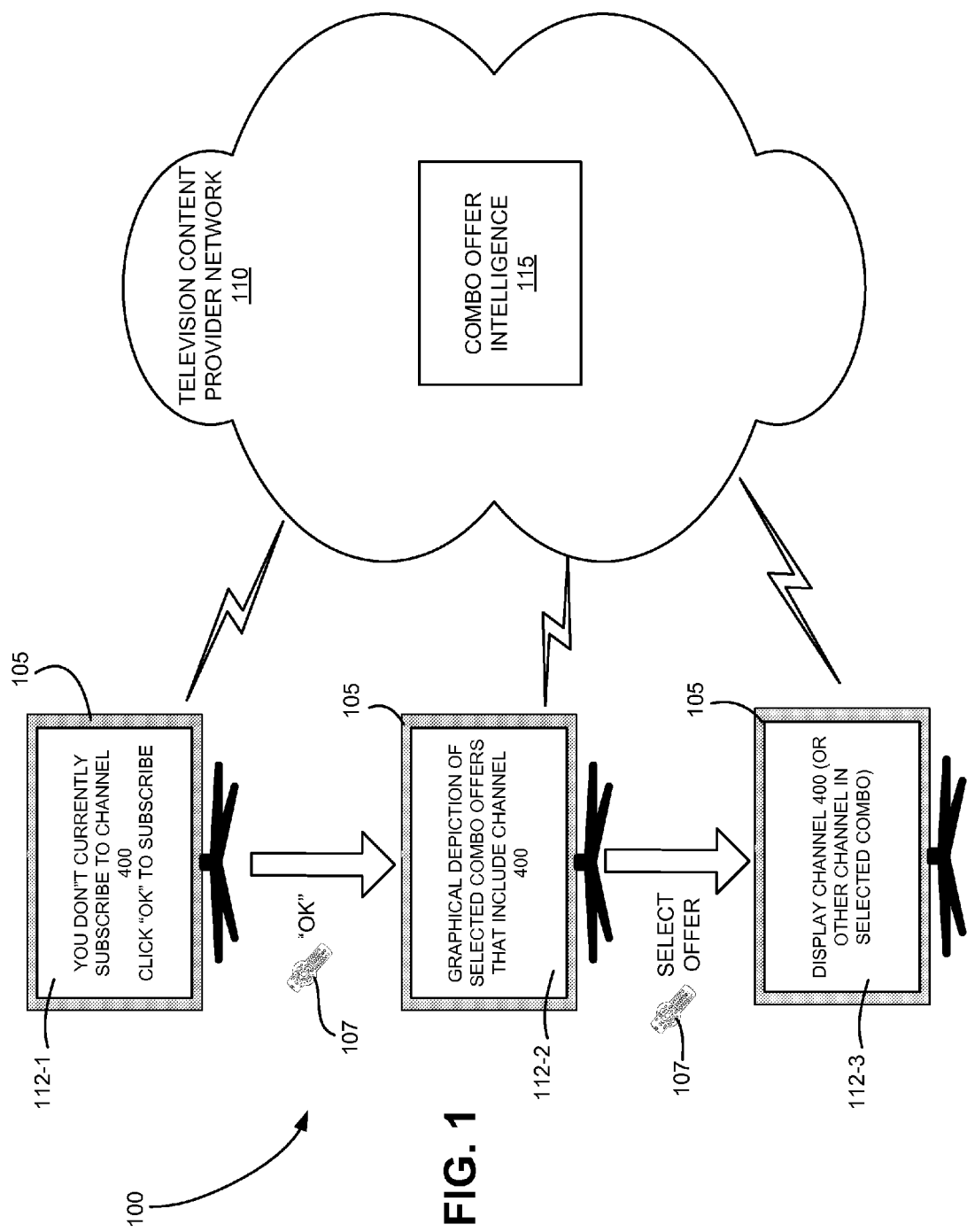
FIG. 1 is a diagram of an overview of an exemplary embodiment for providing multi-feed event viewing.

FIG. 1 is a block diagram depicting an overview 100 of the concepts described herein. For the purposes of this example, assume that a user has navigated to channel 400 via a set-top box (STB)/television 105. Further assume that the customer account associated with the user or STB/television 105 is not initially subscribed to receive content on channel 400. As shown, STB/television 105 may be connected to a television content provider network 110. Upon initial navigation to or selection of channel 400, STB/television 105 may display an interface 112-1 (received from television content provider network 110) indicating that the customer is not currently subscribed to channel 400 and offering the customer an option to subscribe, e.g., by selecting "OK" on remote control 107.

In response to user selection of the subscribe option (e.g., the "OK" button on remote 107), combo offer intelligence 115 in television content provider network 110 may generate or identify one or more content subscription combination offers based on various information associated with the requesting customer. For the purposes of this disclosure, content subscription combination offers refer to bundling or grouping together subscription offers for more than one subscription package. For example, Home Box Office (HBO) may be an offer subscription package and may include a number of different HBO channels. Similarly, the television content provider may offer a Showtime package that includes a number of different Showtime channels. A combination offer may include an offer to subscribe to both the HBO package and the Showtime package for an amount less than the individual subscription fees for each package.

Information used by combo offer intelligence 115 may include customer account profile information that includes the customer's current subscriptions, etc. Based on this information, an initial set of available packages for the customer may be identified. Specific combo offers from within this set may then be generated based on additional information, such as historical information associated with a customer, such as viewing history (e.g., pay-per-view history), digital video recorder (DVR) history, customer preferences (e.g., viewing preferences, etc.), as well as customer demographics information, such as income level, number and ages of household members, subscriber geographic location (e.g., city, state, street address, etc.).

Combo offer intelligence 115 may apply one or more business or marketing rules to customer-related criteria. Examples of such rules may include trial period limitations, location-based marketing campaigns, etc. In some implementations, combo offer intelligence 115 may identify suitable combo offers from a pool of available combination offers, while in other implementations, combo offer intelligence may be configured to dynamically generate or construct combo offers from any number of available channels/packages.

Following generation/identification of one or more combo offers, the combo offers may be transmitted to STB/television 105 and presented to the user via interface 112-2. The user may choose to purchase or subscribe to one of the presented offers (e.g., via remote control 107) and an indication of this selection may be returned to television content provider network 110. The television content provider may, in response to the purchase/subscription of an offer, provision STB/television 105 for receipt of channels included in the purchased content packages. Upon subsequent navigation to a channel included in one of the subscribed packages, STB/television 105 may present the channel to the user via interface 112-3.

Figure 2:
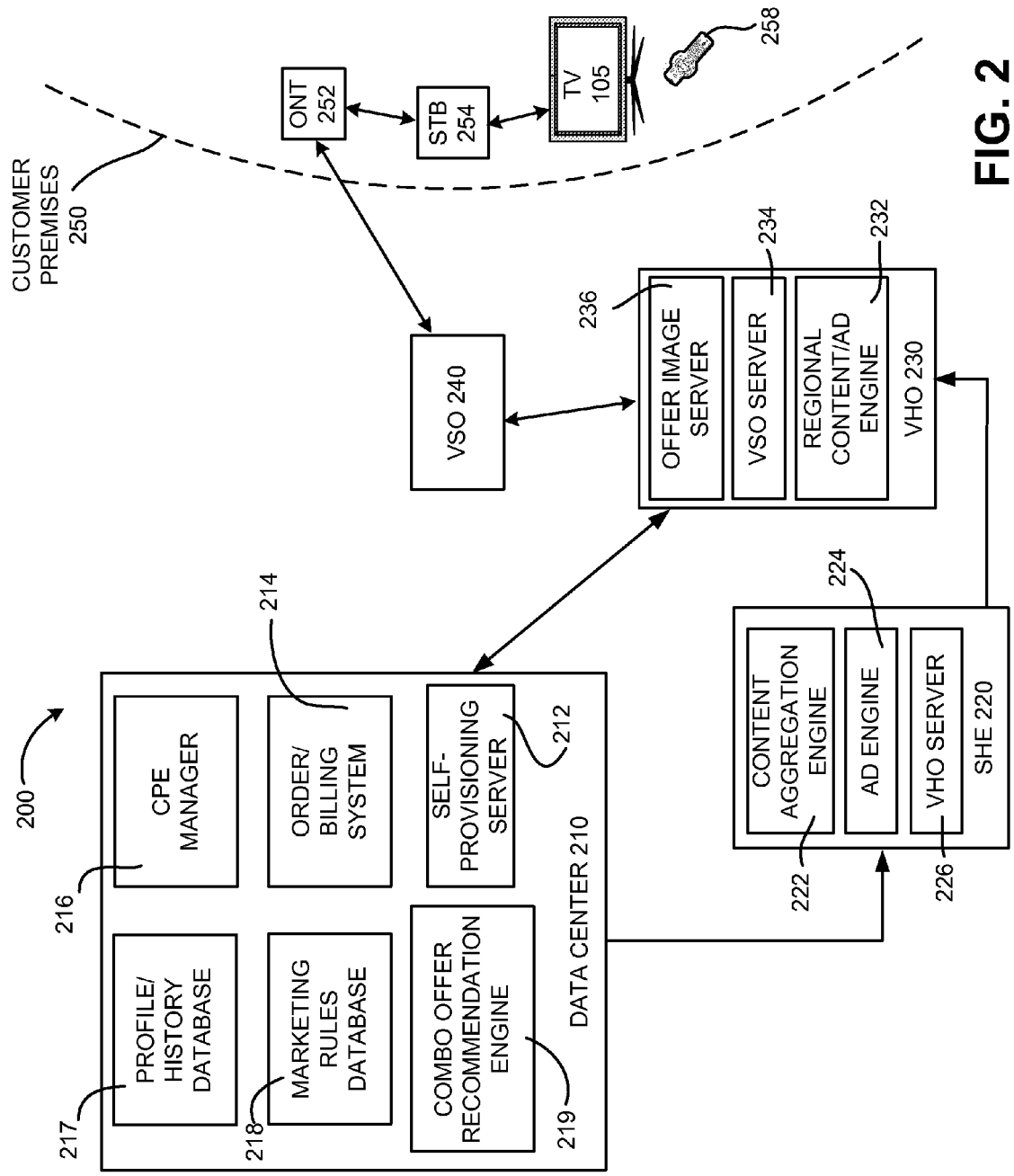
FIG. 2 is a diagram of an exemplary network 200 for implementing the embodiment of FIG. 1 and other embodiments.

FIG. 2 is a diagram of an exemplary network 200 for implementing the embodiment of FIG. 1 and other embodiments. Network 200 may include data center 210, a super head end (SHE) 220, a video hub office (VHO) 230, a video service office (VSO) 240, and customer premises 250.

Customer premises 250 (e.g., the customer's home) includes TV 105 having a display. Customer premises 250 may also include an optical network terminal (ONT) 252, a set-top box (STB) 254, and a remote control 258. ONT 252 may receive data, e.g., on a fiber optic cable, and may transfer the data to TV 105 or STB 254. Likewise, ONT 252 may receive data from any device in customer premises 250 and may transmit the data to other devices in network 200, e.g., through a fiber optic cable.

STB 254 may receive content from VSO 240 and output the content to TV 105 for display. In one embodiment STB 254 may include the functionality of a digital video recorder (DVR) for time-shifting recorded content. In some implementations, STB 252 may include a component (e.g., a cable card or a software package) that plugs into a host device (e.g., a DVR, a personal computer, television 105, a stereo system, etc.) that allows the host device to display content. STB 254 may also be implemented as a home theater personal computer (HTPC), an optical disk player (e.g., digital video disk (DVD) or Blu-Ray™ disc player), a cable card, etc. STB 254 may receive commands from other components in network 200 (e.g., remote control 258).

Remote control 258 may issue wired or wireless commands for controlling other electronic devices, such as TV 105 or STB 254. Remote control 258, in conjunction with STB 254, may allow a user to manually select programs for viewing on TV 105. In one embodiment, remote control 258 may be used in conjunction with STB 254 to allow a user to view and subscribe to subscription offers, for example. Other types of devices (e.g., a keyboard, mouse, mobile phone, etc.) may be used instead of remote control 258.

TV 105 may include speakers as well as a display. TV 105 may play content, for example, received through VSO 240 or from a DVR (e.g., a DVR in STB 254). While some embodiments may use TV 105, other embodiments may display content (e.g., subscription offers) using any device (e.g., a personal computer or mobile phone) capable of receiving and displaying content, for example.

Customer premises 250 may connect to VSO 240. VSO 240 may collect and deliver content (e.g., subscription offers and programming content) to customer premises 250 and may receive data from customer premises 250 for forwarding to the proper destination (e.g., VSO 240, data center 210, or any device in network 200). VSO 240 may include a content server and/or content mixing engine (e.g., a multiplexer/demultiplexer) to select information, such as on-demand content, regional and national video content, interactive content, and/or advertising content, and mix the information together into one or more video streams. VSO 240 may also perform transcoding of the mixed information and/or encoding or encryption functions. In the manner described below, VSO 240 may retrieve and deliver content from other devices in network 200 to customer premises 250. VSO 240, VHO 230, SHE 220, and data center 210, and other devices in network 200 may form part of a high-speed fiber optic network (e.g., FiOS™).

SHE 220 (one of which is shown in FIG. 2 for simplicity) may include a content aggregation engine 222, an advertisement (AD) engine 224, and a VHO server 226. Content aggregation engine 222 may be configured to aggregate national television content from, for example, satellite reception facilities, etc., and convert the content into a format suitable for delivery and distribution via network 200. AD engine 224 may provide and/or manage service provider level national advertising content (e.g., commercials) that is presented within other content prior to distribution to VHO 230. VHO server 226 may transmit national television content (e.g., TNT, ESPN, HBO, Cinemax, CNN, etc.) to one or more regional VHO facilities 230.

Each VHO 230 (one of which is shown in FIG. 2 for simplicity) may include a regional content/advertising engine 232, a VSO server 234, and an offer image server 236. Regional content/ad engine 232 may receive and format regional television content (e.g., local broadcast stations, community access stations, etc.) and regional advertising content for distribution to the VSO facilities 240 operating under each VHO 230. VSO server 234 may provide the nation television content (e.g., from SHE 240) and regional television content (e.g., from regional content/ad engine 232) to VSO 240, for subsequent delivery to customer premises 250.

As will be described in additional detail below, in addition to television content, VHO 230 may also provide image or video data for use in presenting combination subscription offers via offer image server 236. For example, offer image server 236 may include a regional repository of graphics, images, and videos representative of subscription channel, package, and combination offerings.

Data center 210 may include one or more servers or other network devices (collectively, "network devices") that manage and/or store data associated with customer premises 250, customer or user accounts, and available television content (e.g., national and regional/local television content) provided by SHE 220 and/or VHO 230. As shown in FIG. 2, data center 210 may include a self-provisioning server 212, an order/billing system 214, a customer premises manager 216, a profile/history database 217, a marketing rules database 218, and a combo offer recommendation engine 219. Devices in data center 210 may include one or more computers for hosting programs, such as a web server (e.g., Apache), a database (e.g., MySQL), or other applications.

Self-provisioning server 212 may include a server or system configured to enable customers to initiate or place orders for new service or make changes to existing service. For example, self-provisioning server 212 may provide an interface for providing available service options to customers and receiving selection of one or more of the options. Self-provisioning server 212 may interact with order/billing system 214 to enter the service selections into a billing system and to initiate any order provisioning workflow entries necessary to provide the service to the customer. Self-provisioning server 212 may further interact with customer premises manager 216 to allow devices in customer premises (e.g., STB 254, TV 105, ONT 253, etc.) to access the selected services.

Order/billing system 214 may include one or more servers or systems configured to maintain order and billing information regarding customer accounts. For example, order/billing system 214 may include a customer database that maintains customer account and billing information, such as a listing of currently subscribed to services, a number of STBs 254 (or TVs 105 or cable cards, etc.), payment information, etc.

In addition to storing customer account and billing information, order/billing system 214 may also include components configured to provision physical, logical, and/or system resources associated with the customer account and the selected services and to bill customers for provided services.

Customer premises equipment (CPE) manager 216 may be configured to manage and control devices or equipment in customer premises 250, such as ONT 252, STB 254, etc. For example, CPE manager 216 may be configured to transmit signals (e.g., via VHO 230 and VSO 220) to STB 254 to authorize reception, decoding, and display of particular television channels.

Profile/history database 217 may include a server that stores information about user preferences and viewing history, preferences/history of a group of users, or other information to determine such preferences. For example, profile/history database 217 may include metadata associated with programs previously viewed by a user or group of users (e.g., a family at customer premises 250). As another example, profile/history database 217 may store information about the types of programs a user or a group of users prefers. Profile/history database 217 may also store information about customer demographics, such as income level, number and ages of household members, subscriber geographic location (e.g., city, state, street address, etc.).

Marketing rules database 218 may include a server that stores a number of marketing rules used by combo offer recommendation engine 219. Rules may relate potential package combinations to various elements of customer-related criteria (e.g., corresponding to information stored in order/billing system 214 and profile/history database 217). In some implementations, the marketing rules may include ranking information used by combo offer recommendation engine 219 to rank resulting combination offers. Furthermore, the marketing rules in marketing rules database 218 may be based on national/regional advertising campaigns, or may be based on non-directed combinations of channels or packages.

In some implementations, marketing rules may be linked, such that application of a first rule to a set of customer data may cause application of a second rule. For example, a first marketing rule may direct that a particular package combo (e.g., NHL Center Ice and NBA League Pass) be offered to all customers in the state of Virginia, and a second marketing rule may exclude customers in zip code 20175 from the offer. The second rule may identify a substitute package offer in place of the NHL Center Ice/NBA League Pass combo offer. In this example, regional demographics may indicate that residents in 20175 are less likely than residents in the rest of Virginia to purchase the NHL Center Ice/NBA League Pass package.

Combo offer recommendation engine 219 may be configured to generate and/or identify combination channel/package offerings (also referred to as "combo offers") for presentation to customers. For example, as briefly described above, combo offer recommendation engine 219 may be configured to generate and/or identify one or more combo offers based on customer information and one or more marketing rules when queried by self-provisioning server 212. The customer information may be obtained/retrieved from order/billing system 214 and profile/history database 217.

Combo offer recommendation engine 219 may obtain or retrieve a number of marketing rules from marketing rules database 218 for generating combo offers based on the retrieved customer information. That is, the customer information retrieved from order/billing system 214 and profile/history database 217 may be matched to the marketing rules relating to the requested channel that have been obtained from marketing rules database 218. When the customer information matches a marketing rule, the associated combo offer may be selected for providing to the user.

For example, a marketing rule may indicate that customers within 12 miles of Dallas, Tex. that request HBO should be offered a three month free trial of the HBO and Showtime packages. In some instances, rules may be multi-step. That is, a satisfaction of a first rule step may trigger examination of a second rule step, etc. For the above example, the three month free trial may be limited to only subscribers who have not had a free trial of any package within the past 12 months. Consistent with implementations described herein, marketing rules may be applied on a highly granular basis, resulting in different combo offers being generated for different subscribes based on a wide variety of factors.

The exemplary configuration of devices in network 200 is illustrated for simplicity. Network 200 may include more devices, fewer devices, or a different configuration of devices than illustrated in FIG. 2. For example, network 200 may include thousands or millions of customer premises. As another example, network 200 may include a cable modem in a customer premises for receiving and transmitting data. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
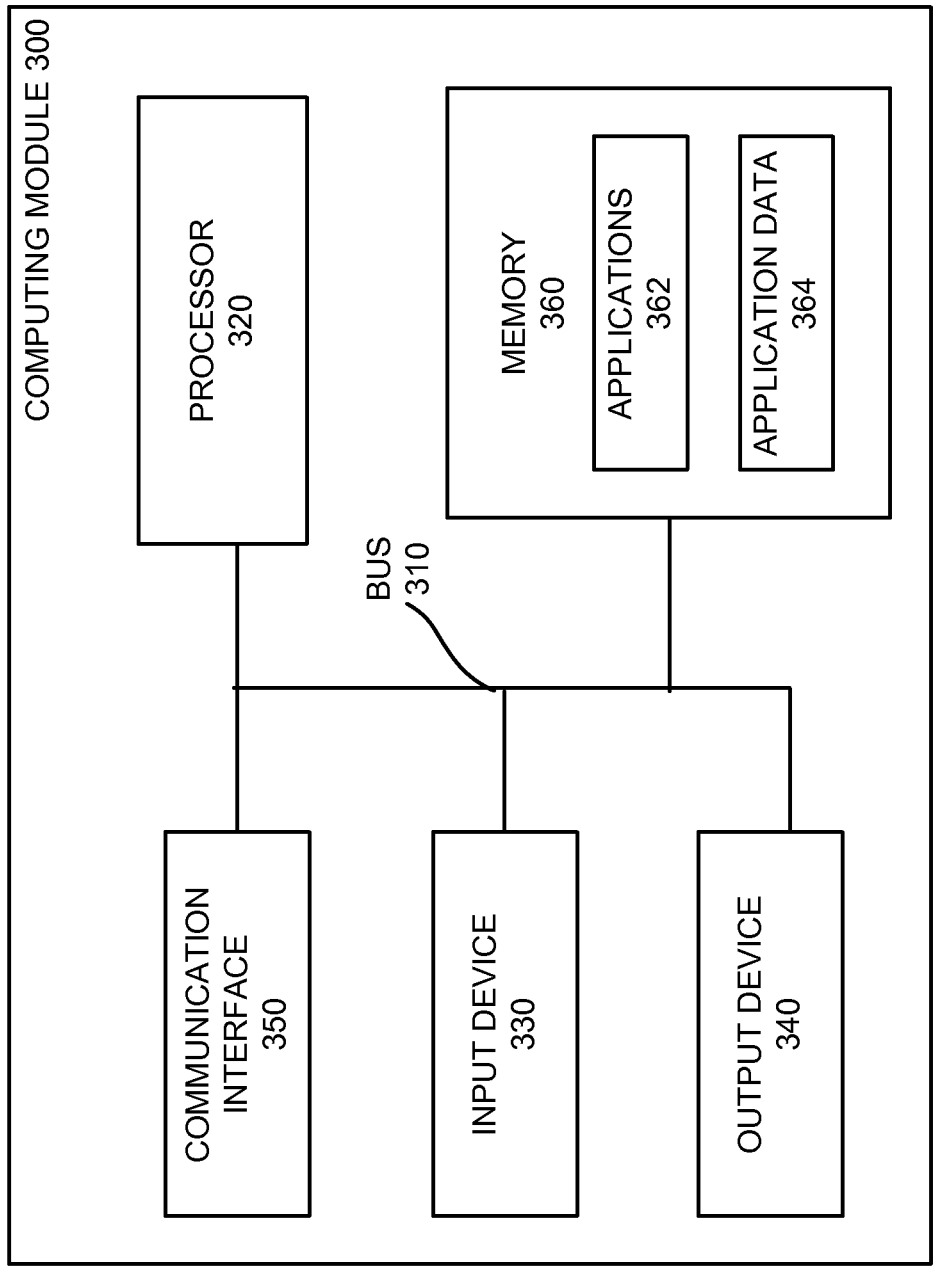
FIG. 3 is a block diagram of exemplary components of a computing module.

Devices in network 200 may each include one or more computing modules. FIG. 3 is a block diagram of exemplary components of a computing module 300. Computing module 300 may include a bus 310, processor 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processor 320 may include any type of processor or microprocessor (or families of processors or microprocessors) that interprets and executes instructions. In other embodiments, processor 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 258), an audio capture device, an image and/or video capture device, a touch-screen display, etc. Some devices, such as components 212, 214, 216, 217, 218, and 219 may be managed remotely and may not include input device 330. In other words, some devices may be "headless" and may not include a keyboard, for example.

Output device 340 may output information to the user. Output device 340 may include a display, a printer, a speaker, etc. For example, TV 105, a personal computer, etc. may include a display (an output device), which may include a liquid-crystal display (LCD) for displaying content to the user. As another example, ONT 252 and STB 254 may include light-emitting diode (LED) based displays. Headless devices, such as components 212, 214, 216, 217, 218, and 219 may be managed remotely and may not include output device 340.

Input device 330 and output device 340 may allow a user to activate and interact with a particular service or application, such as an interactive event viewing application, an interactive program guide (IPG), a digital video recorder (DVR), a web browser, or a video editing program. Input device 330 and output device 340 may allow a user to receive and view a number of options or features and select from the options. The options or features may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 362) and data (e.g., application data 364) for use by processor 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive). Applications 362 and application data 364 may provide network services or include applications, depending on the device in which the particular computing module 300 is found.

Computing module 300 may perform the operations described herein in response to processor 320 executing software instructions contained in a computer-readable medium, such as memory 360. A computer-readable medium may include a physical or logical memory device. The software instructions may be read into memory 360 from another computer-readable medium or from another device via communication interface 350. The software instructions contained in memory 360 may cause processor 320 to perform processes that are described herein.

Figure 4A:
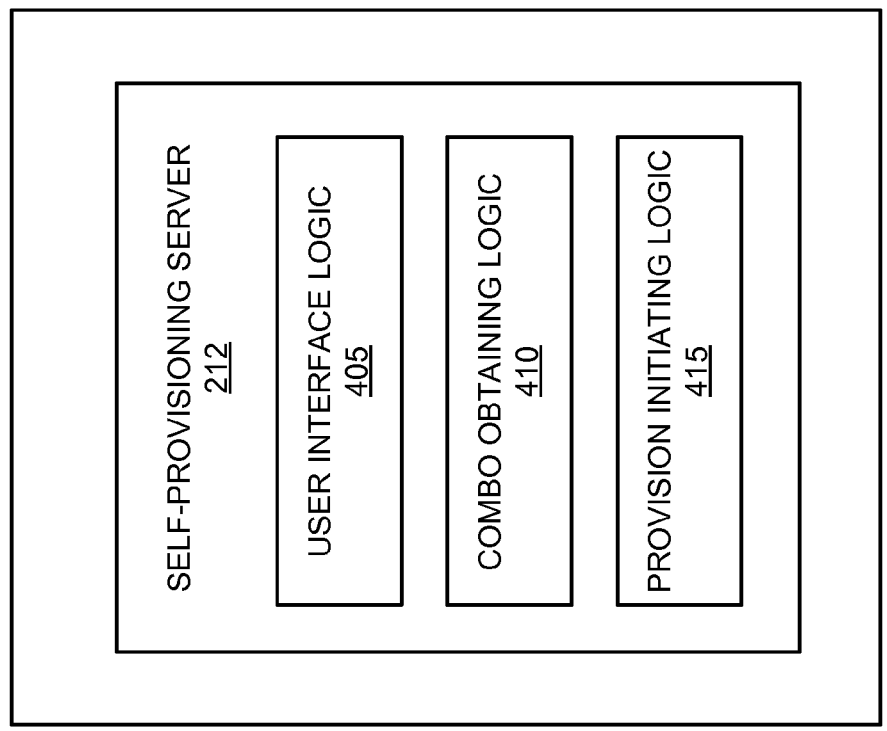
FIG. 4A is a block diagram of exemplary components of the self-service provisioning server of FIG. 2.

As described above, network 200 may enable the generation and presentation of one or more dynamically determined combo offers for selection and self-provisioning by customers. FIG. 4A is a block diagram of exemplary components of self-service provisioning server 212 (e.g., functions performed by application 362 in processor 320 or stored in memory 360 of self-service provisioning server 212). Self-provisioning server 212 may include user interface logic 405, combo obtaining logic 410, and provision initiating logic 415.

User interface logic 405 may include logic configured to receive and transmit information to/from user devices, such as STB 254, TV 105, etc. For example, user interface logic 405 may receive requests from STB 254 relating to selection of one or more available options by a user, such as selection of a purchase/order/subscribe option, etc. User interface logic 405 may transmit or forward information to STB 254 from other components of data center 210, such as customer account information from order/billing system 214, preferences or profile information from profile/history database 217 and/or combo offer information from combo offer recommendation engine 219.

Combo obtaining logic 410 may query combo offer recommendation engine 219 to provide one or more combo offers for presenting to the customer via user interface logic 405. For example, combo obtaining logic 410 may query combo offer recommendation engine 219 based on an identifier associated with the customer and an identification associated with a selected channel or package. In other implementations, the query may be based on an identifier associated with STB 254 (e.g., a "circuit identifier"), in replace of or in addition to the customer identifier.

Combo obtaining logic 410 may receive information relating to one or more combo offers from combo offer recommendation engine 219 and may forward the combo offers to STB 254 via user interface logic 410. In some implementations, images and/or videos (e.g., previews, trailers, etc.) associated with the combo offers may be identified in offer image server 236 on VHO 230. Upon display by STB 254, the identified images or videos may be retrieved from offer image server 236. In this manner, latency between requesting the offers and displaying the combo offers is reduced.

Provision initiating logic 415 may receive service/channel/package provisioning requests from customers via user interface 405. For example, the customer may select a particular combo offer at STB 254 for ordering/purchasing (e.g., by selecting an option on a graphical user interface, etc.). User interface logic 405 may receive this selection and initiate provisioning of the requested channels or packages via order billing system 214, customer premises manager 216, etc.

Figure 4B:
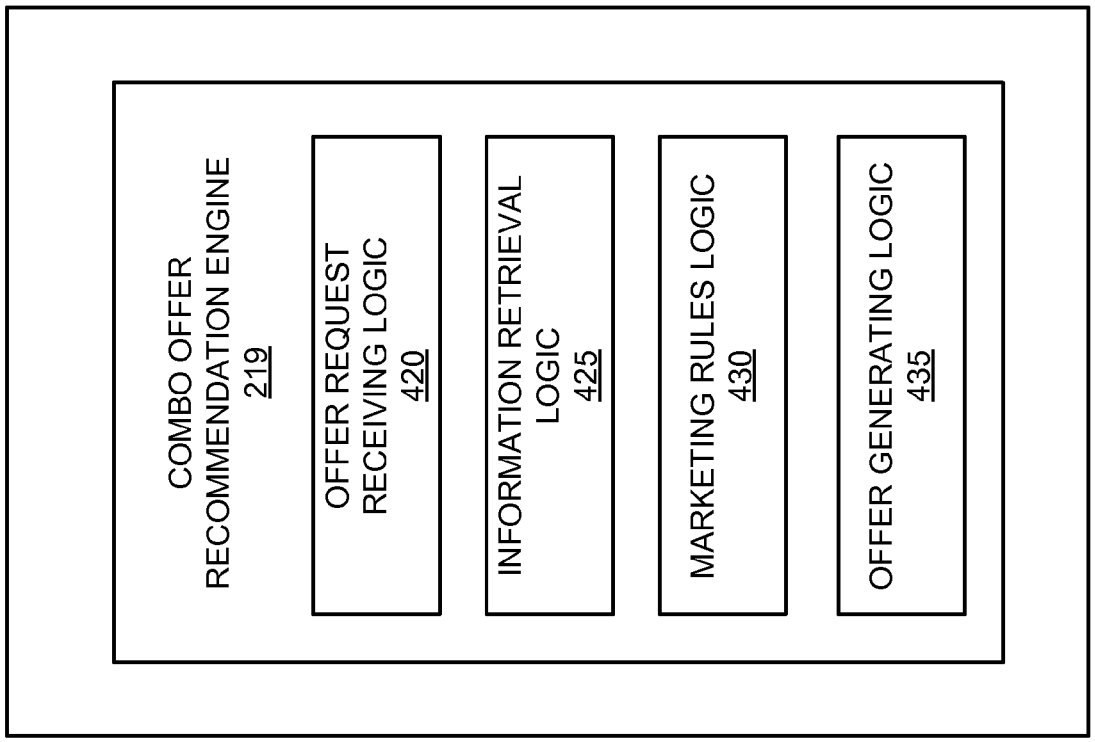
FIG. 4B is a block diagram of an exemplary component of the combo offer recommendation engine of FIG. 2.

FIG. 4B is a block diagram of exemplary components of combo offer recommendation engine 219 (e.g., functions performed by application 362 in processor 320 or stored in memory 360 of combo offer recommendation engine 219). Combo offer recommendation engine 219 may include offer request receiving logic 420, information retrieval logic 425, marketing rules logic 430, and offer generating logic 435.

Offer request receiving logic 420 may be configured to receive a request for combo offers from user interface logic 405. For example, as described above, a request for combo offers may be based on an identifier associated with the customer or STB 254, and/or an identification associated with a selected channel or package.

Information retrieval logic 425 may retrieve customer information from order/billing system 214 and profile/history 217 based on the received offer request. Exemplary customer information may include viewing preferences, demographics information, current subscription level, viewing/order history, prior trial period information, etc. In some implementations, information retrieval logic 425 may retrieve information from order/billing system 214 and profile/history 217 based on the received customer/STB identifiers.

Marketing rules logic 430 may retrieve a number of marketing rules from marketing rules database 218 based on the retrieved customer information. For example, rules may be retrieved based on geographic location information associated with the customer. In other implementations, all rules in marketing rules database 218 may be retrieved for execution against the obtained customer information by offer generating logic 435.

Offer generating logic 435 may be configured to generate and/or identify combination offers for presentation to the user based on the marketing rules information retrieved from marketing rules database 218 and the customer information retrieved from order/billing system 214 and profile/history 217. For example, as described above, offer generating logic 435 may compare or match the retrieved marketing rules to the retrieved customer information. When the customer information matches a marketing rule, the associated combo offer may be selected for providing to the user.

In some implementations, offer generating logic 435 may rank the combo offers resulting from execution of the rules. For example, the combo offers identified by applying the marketing rules to the customer information may be ranked by elements of the customer information, such as order history, viewing history, prior combo offer presentation, etc., even where such information is not used as a basis for the initial offer selection. For example, a marketing rule based solely on customer location may be ranked based on the viewing history of the user. In other implementations, combo offers may be ranked based on the cost impact to the customer. For example, combo offers resulting in a value to the customer (e.g., relative to a la carte or current subscriptions) may be ranked higher than combo offers having a lower value.

Information regarding the highest ranking combo offers may be forwarded to STB 254 for display to the user. For example, information regarding the five highest ranking combo offers may be transmitted to STB 254 via self-provisioning server 212, VHO 230, and VSO 240. The information may include combo description information, combo pricing information, cost comparison information (e.g. comparing combo pricing to a la carte or current subscription pricing), etc. In some implementations, upon receipt of the combo offer information, STB 254 may retrieve images and/or videos corresponding to the offers from offer image server 236 on VHO 230.

Figure 4C:
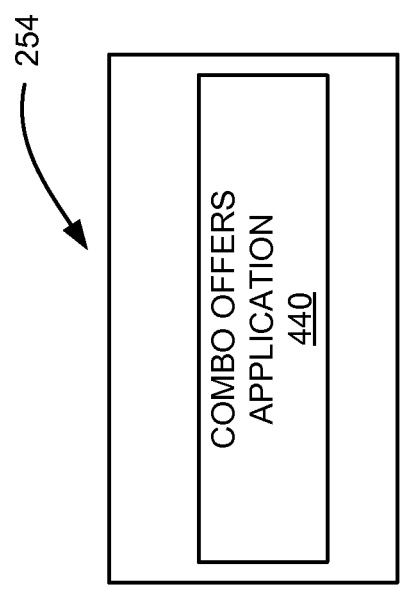
FIG. 4C is a block diagram of an exemplary component of the set-top box of FIG. 2.

FIG. 4C is a block diagram of an exemplary component of STB 254 (e.g., functions performed by application 362 in processor 320 or stored in memory 360 of STB 254). STB 254 may include a combo offers application 440. TV 105 or any other user device (e.g., a computer, mobile device, etc.) may be similarly configured and may also allow a user to interact with self-provisioning server 212 to view and/or select one or more combo offers.

Combo offers application 440 may include a combination of software and/or hardware components for receiving interface and combo offer information from user interface logic 405 of self-provisioning server 212. More specifically, combo offers application 440 may be configured to present the one or more combo offers generated by combo offers recommendation engine 219. For example, combo offers application 440 may be configured to, upon activation or execution on STB 246 (e.g., upon user selection of a channel to which the user does not currently subscribe), present a graphical user interface (GUI) for display via TV 105. The GUI may provide users with options relating to viewing available combo offers and selecting offers, channels, or packages for purchase. User selections may be transmitted to self-provisioning server 212 in the manner described above.

Figure 5A:
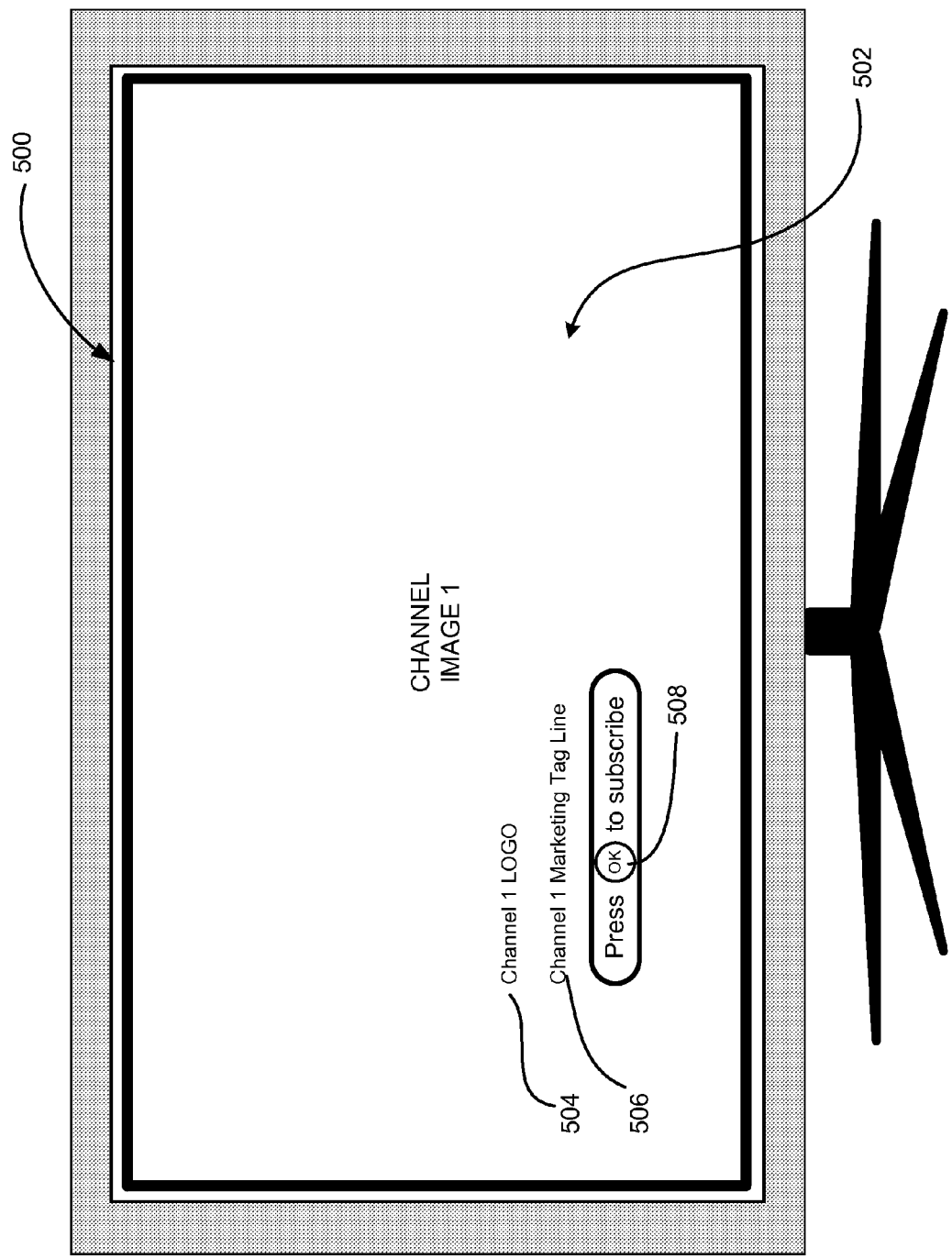

FIG. 5A illustrates one exemplary implementation of such an interface. As shown, FIG. 5A illustrates a GUI 500 presented to a user upon selection of a channel to which the customer does not currently subscribe. As shown, GUI 500 may include an image/video display portion 502, a channel name section 504, a channel marketing section 506, and a purchase option 508. Image/video display portion 502 may be configured to provide a large (e.g., full screen) image or video clip corresponding to the selected channel or, alternatively, an image/video clip corresponding to a package in which the selected channel is a member. For example, image/video display portion 502 may be configured to display imagery associated with a movie or sporting event prominently associated with the selected channel.

Channel name section 504 may include a name or logo of the selected channel and channel marketing section 506 may include a marketing tagline or description of the channel. Purchase option 508 may include a button or other user-selectable interface element. When the user wishes to purchase or subscribe to the selected channel, the user may select purchase option 508 (e.g., by selecting an "ok" button on remote control 258, navigating to the purchase option 508 and selecting an "enter" button on remote control 258, etc.).

Figure 5B:
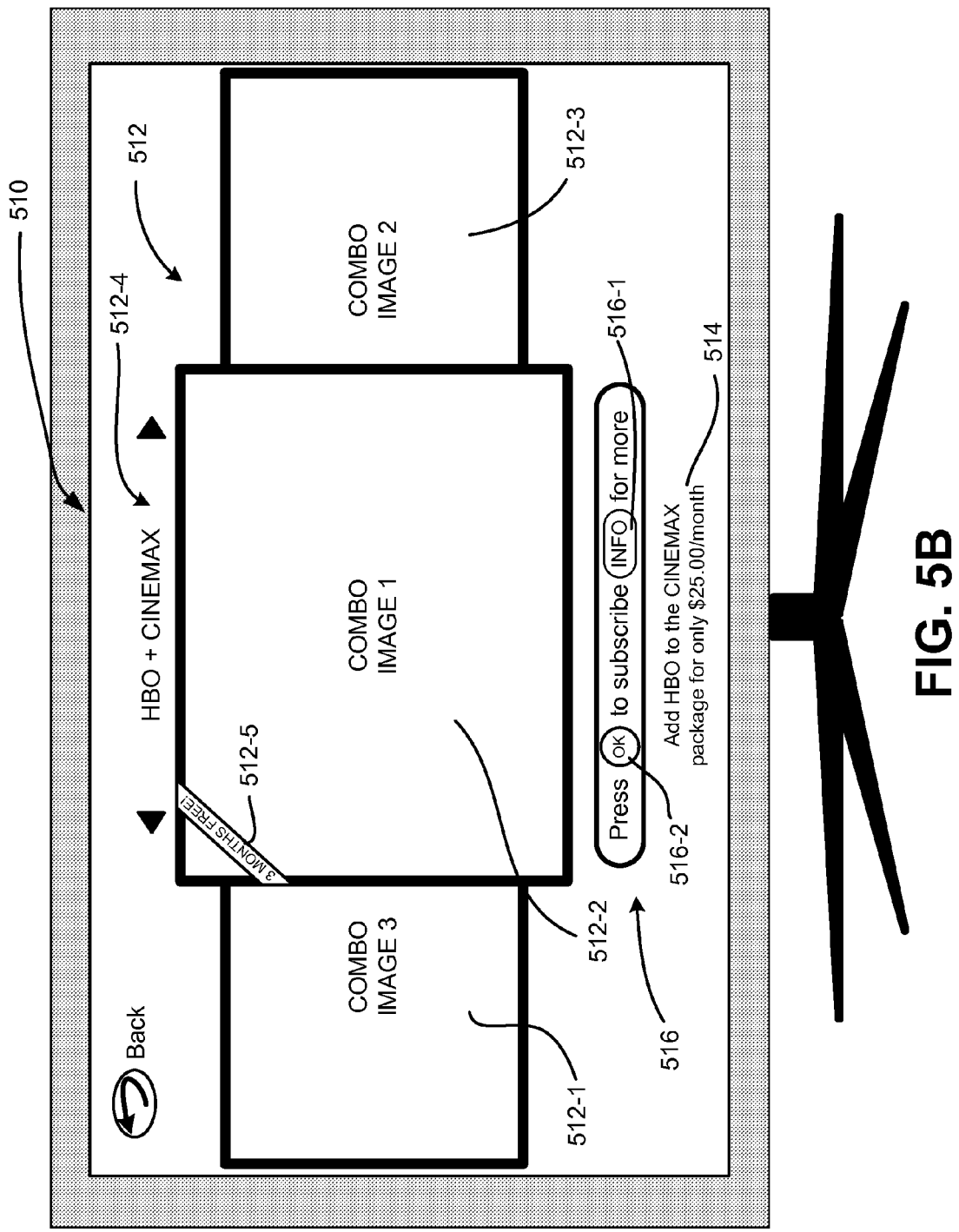

FIG. 5B illustrates an exemplary GUI 510 presented to the user following user selection of purchase option 508 in GUI 500. As shown, GUI 510 may include a combo offer presentation section 512, a cost information section 514, and a purchase/more information option interface element 516. Combo offer presentation section 512 may include a number of combo image presentation tiles 512-1 to 512-3 (collectively referred to as combo image presentation tiles 512), a name/navigation element 512-4, and a special marker 512-5.

As shown in FIG. 5B, each of combo image presentation tiles 512-1 to 512-3 include imagery (e.g., images, videos, etc.) corresponding to a different package or channel combo. For example, each combo image presentation tile 512 may include a still image recognizably representative of one or more of the channels available in the combo. For example, tile 512-2 may be associated with a combo offer that includes HBO and Cinemax, tile 512-1 may be associated with a combo offer that includes HBO, Cinemax, and the Movie Channel, and tile 512-3 may be associated with a combo offer that includes HBO, Showtime, and four pay-per-view movies per month. The imagery provided in combo image presentation tiles 512 may change periodically in a manner similar to a photo slide show, with each image represent content associated with the respective combo.

In some implementations, combo presentation tiles 512 may be arranged in a manner that facilitates easy user recognition and browsing of the available combos, such as a grid view, a flip-chart style view, or a row view (as shown in FIG. 5B). In the row view shown in FIG. 5B, a selected or central combo presentation tile 512 may be enlarged relative to the non-selected side combo presentation tile 512.

As shown in FIG. 5B, combo presentation tiles 512 may further include special marker 512-5 to further distinguish one or more features of the respective combo. For example, special marker 512-5 may be configured to describe an available trial period, a cost savings description, an event associated with the combo (e.g., a particular show, such as Entourage, etc.). Although depicted as a ribbon in FIG. 5B, special marker 512-5 may take any suitable appearance, such as an icon, a shape (e.g., star), a banner on the corresponding combo presentation tile 512, etc. In some implementations, more than one special marker 512-5 may be associated with a particular combo presentation tile 512.

The inclusion of special marker 512-5 may be established as part of the combo by combo offer recommendation engine 219 and may be included based on customer information, and/or marketing rules. Information regarding special markers 512-5 may be included in the combo offer information received by combo offers application 440 in STB 254 from self-provisioning server 212.

Name/navigation element 512-4 may include a name associated with the selected combo and selectable navigation elements selection which enable the user to navigate between the available combo offers. In some instances, the name provided in name/navigation element 512-4 may be descriptive of the channels/packages being combined, such as "HBO+Cinemax." In other instances, the name may be descriptive of the combo offer, such as "Movie Lover's Combo," "Sports Fanatic Pack," etc.

Cost information section 514 may present information relating to the cost to customer of purchasing/ordering the selected combo. The cost information for each combo may be included in the combo offer information received by combo offers application 440 in STB 254 from self-provisioning server 212. As described briefly above, in some instances, the combo cost information provided in cost information section 514 may be presented relative to costs of the individual package/channels included in the combo, or relative to a subscribers current subscription cost.

Purchase/more information option interface element 516 may include a more option 516-1 and a subscribe option 516-2. User selection of more option 516-1 causes a next set of combo offers to populate GUI 510. For example, upon receiving a user selection of more option 516-1, combo offers application 440 may present the next highest ranked combo offers in GUI 510. In some implementations, GUI 510 may provide a subscribe offer corresponding to the selected channel only (and not a combo). In this manner, users not wishing to subscribe to a combo may be able to order the desired channel a la carte.

When the user wishes to purchase or subscribe to the selected combo, the user may select subscribe option 516-2 (e.g., by selecting an "ok" button on remote control 258, navigating to the subscribe option 516-2 and selecting an "enter" button on remote control 258, etc.). FIG. 5C illustrates an exemplary GUI 520 presented to the user following user selection of subscribe option 516-2 in GUI 510. As shown, GUI 520 may include a confirmation information section 522, a cancel option 524, and a buy option 526.

Confirmation information section 522 may include a description of the combo selected for subscription via GUI 510 and the monthly cost of the combo subscription. In some implementations, confirmation information section 522 may further include one or more images 522-1 to 522-5 associated with the selected combo, such as movie/DVD cover art for movies/shows available on the selected combo.

If the user wishes to cancel the subscription of the selected combo, the user may select cancel option 524. However, when the user wishes to confirm the subscription of the selected combo, the user may select subscribe option 526. Selection of subscribe option 526 for a particular combo offer may cause combo offers application 440 to provide subscription/order information regarding the selected combo and the particular customer to self-provisioning server 212 for order fulfillment (e.g., via order/billing system 214 and customer premises manager 216, etc.).

Figure 6:
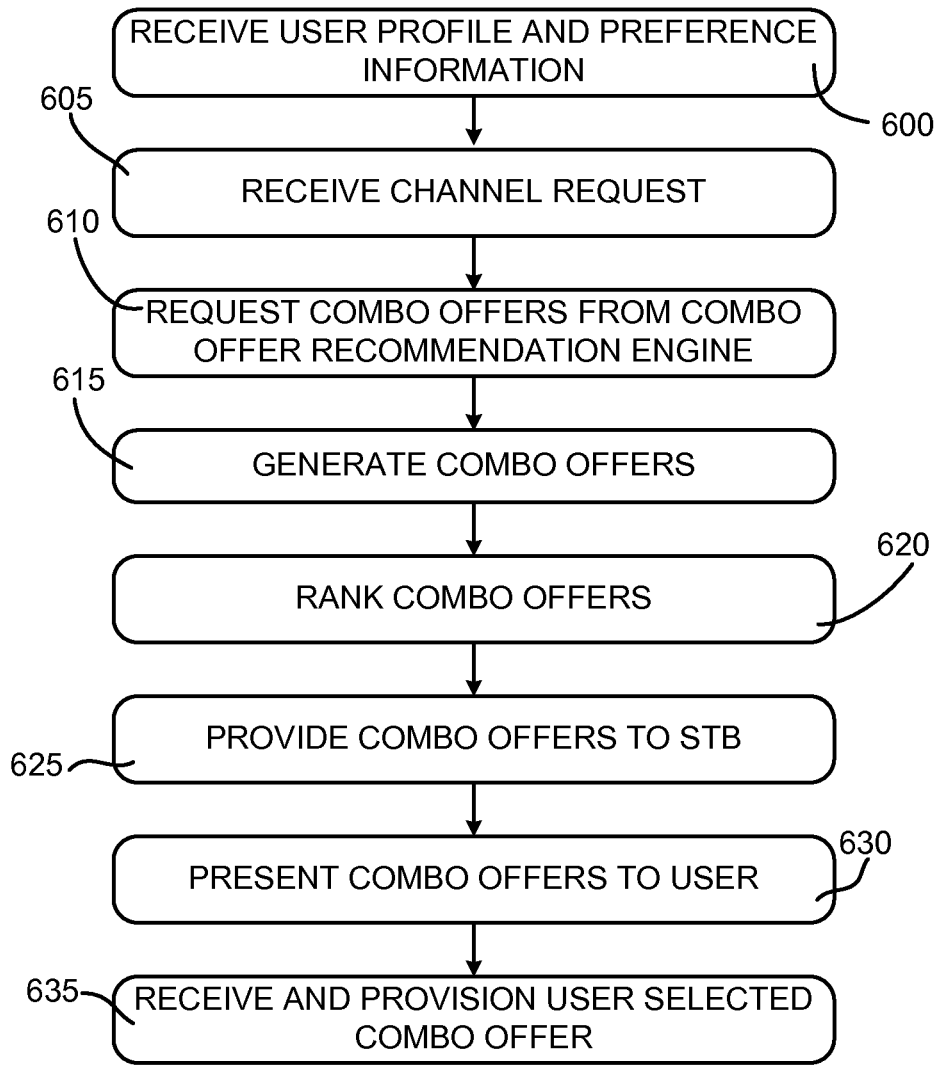
FIG. 6 is a flow diagram illustrating exemplary processing associated with generating/identifying and providing content combination offers for purchase by a user.

FIG. 6 is a flow diagram illustrating exemplary processing associated with generating/identifying and providing content combination offers for purchase by a user. Processing may begin with data center 210 receiving and storing customer profile and preference information relating to the user (block 600). For example, order/billing system 214 may receive and store subscription, billing, purchase/order history, and geographic location information for the user (e.g., for the customer associated with the user). In addition, profile history database 217 may receive and store user preferences, viewing history, etc.

Self-provisioning server 212 may receive a user request to provision or subscribe to a channel that the customer does not currently subscribe to (block 605). For example, STB 254 may receive a user selection of a channel in an interactive program guide or via selection of channel buttons on remote control 258. STB 254 may forward the request to self-provisioning server 212 via VHO 230.

Self-provisioning server 212 may request suitable combo offers relating to the requested channel from combo offer recommendation engine 219 (block 610). For example, self-provisioning server 212 may forward channel and customer identification information to combo offer recommendation engine 219. Combo offer recommendation engine 219 may identify or generate one or more combo offers in response to the received request (block 615).

For example, as described above, combo offer recommendation engine 219 may retrieve customer information relating to the combo offer request from order/billing system 214 and profile/history database 217. This information may include current subscription information, historical subscription information, user profile/preference information, demographics information, viewing history information, etc. Combo offer recommendation engine 219 may also retrieve marketing rules from marketing rules database 218. The marketing rules may be associated with the requested channel and the retrieved customer information, e.g., demographics information, location information, etc.

Combo offer recommendation engine 219 may generate or identify a number of combo offers based on the customer/channel information and the retrieved marketing rules. For example, combo offer recommendation engine 219 may identify a number of available combo offers that include the selected channel based on the retrieved marketing rules. The identified combo offers may be based on customer information, such as prior purchase history, recency of last free trial period, geographic location of the customer, etc. As described above, in some implementations, combo offer recommendation engine 219 may initially identify a set of available packages based on the customer account information (e.g., current subscriptions, etc.). The identified combo offers may then be generated/selected based on the available packages.

Combo offer recommendation engine 219 may rank the identified combo offers based on a likelihood that the user will select the offer, for example (block 620). In some instances, the likelihood of selection or purchase may be based on user profile, preferences, and history information. Combo offer recommendation engine 219 may provide a number of the highest ranking combo offers to STB 254, e.g., via self-provisioning server 212 (block 625). For example, combo offers application 440 executing on STB 254 may receive combo offer information from self-provisioning system 212.

Combo offers application 440 may present one or more of the combo offers to the user (block 630). For example, combo offers application 440 may present the combo offers in a number of combo image presentation tiles 512 in GUI 510. Combo offers application 440 may receive user selection/purchase confirmation for a selected combo offer and may forward the purchase confirmation to self-provisioning server 212 for order fulfillment (e.g., via order/billing system 214 and customer premises manager 216, etc.) (block 635).

Implementations described herein relate to devices, methods, and systems for facilitating the generation, display, and purchase of offers for combinations of television content. In some implementations, upon user selection of a channel or content not currently subscribed to, a video service provider may identify or generate a number of combination offers for selection by the user. Consistent with implementations described herein, the identified offers may be based on a number of factors including, marketing rules or advertising campaigns, user or customer demographics, customer profile or preference information, and/or the customer's prior viewing or ordering history. The identified offers may be ranked and provided to the user in a ranked order for browsing and ultimate selection. Upon purchase of a combination offer, the service provider will provision the system thereby allowing the customer to view the purchased content.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a data center 210 performing combo offer generation and an STB 254 outputting the combo offers to a user. However, in other implementations, features described herein may be implemented in other devices.

Further, while series of blocks have been described with respect to FIG. 6, the order of the acts associated with the blocks may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, at server and via a set-top box (STB), a user request to view a broadcast or cable television channel to which the user does not currently subscribe;
   providing, by the server, to the STB, and in response to receiving the user request, an image or video corresponding to the broadcast or the cable television channel and an option to subscribe to the broadcast or cable television channel;
   obtaining, by the server and from a first database stored in a first memory, customer information regarding the user, wherein the customer information comprises at least prior offer information and prior trial period data;
   obtaining, by the server and from a second database stored in a second memory, marketing rules regarding a plurality of combination offers that include the broadcast or cable television channel;
   determining, by the server, a second plurality of combination offers from the plurality of combination offers based on the customer information for the user and the marketing rules, wherein the second plurality of combination offers are determined for the user;
   providing, by the server and to the STB, two or more of the determined second plurality of combination offers for simultaneous display by the STB, wherein providing the two or more of the determined second plurality of combination offers comprises:
      providing a plurality of images corresponding to each of the two or more of the determined second plurality of combination offers, wherein each image of the plurality of images corresponding to a particular combination offer of the two or more of the determined second plurality of combinations offers corresponds to a channel available in the particular combination offer, wherein the plurality of images are displayed in a dynamic manner, in which each displayed image is periodically replaced by another image from the plurality of images;
   receiving, at the server, a user request to purchase a selected combination offer of the provided second plurality of combination offers; and
   providing, by the server, to the STB, and in response to receiving the user request to purchase the selected combination offer, a purchase confirmation that includes information associated with the selected combination offer.

2. The computer-implemented method of claim 1, further comprising:
   provisioning channels included within the selected combination offer based on the user request to purchase the selected combination offer.

3. The computer-implemented method of claim 1, wherein the customer information further comprises one or more of: viewing history information or order history information.

4. The computer-implemented method of claim 1, wherein the marketing rules comprise sets of combination offers and customer information criteria,
   wherein determining the second plurality of combination offers based on the customer information and the marketing rules, comprises:
      comparing the customer information criteria for the marketing rules to the obtained customer information; and
      identifying combination offers associated with the marketing rules for providing to the user in which the customer information criteria matches the obtained customer information.

5. The computer-implemented method of claim 4, wherein the marketing rules comprise multi-step rules, the method further comprising:
   comparing a second marketing rule to the obtained customer information when the customer information criteria for a first rule matches the obtained customer information; and
   identifying the combination offer associated with the first and second rule for providing to the user when the obtained customer information matches both the first and second rules.

6. The computer-implemented method of claim 1, further comprising:
   ranking the determined second plurality of combination offers based on a cost impact to the user; and
   providing the one or more of the determined second plurality of combination offers to the user in a ranked order based on the ranking.

7. The computer-implemented method of claim 6, wherein ranking the determined second plurality of combination offers is further based on a likelihood that the user will select a particular combination offer.

8. The computer-implemented method of claim 7, wherein ranking the determined second plurality of combination offers is further based on the customer information or the marketing rules.

9. The computer-implemented method of claim 1, wherein providing one or more of the determined second plurality of combination offers to the user comprises:
   transmitting information relating to the determined second plurality of combination offers to a set-top box associated with a customer premises location corresponding to the user.

10. The computer-implemented method of claim 9, wherein information relating to the determined second plurality of combination offers comprises references to images or videos for presentation with the determined second plurality of combination offers.

11. A system comprising:
a service provider; and
a user device connected to the service provider via a network,
wherein the service provider is to:
receive a request from the user device to view a broadcast or cable television channel that the user device is not currently authorized to receive;
provide, in response to receiving the request, an image or video corresponding to the broadcast or cable television channel and an option to subscribe to the broadcast or cable television channel;
obtain, from a first database, customer information associated with the user device,
wherein the customer information comprises at least prior offer information and prior trial period data;
obtain, from a second database, marketing rules regarding a plurality of combination offers that include the channel;
identify a second plurality of combination offers from the plurality of combination offers based on the customer information and the marketing rules;
transmit information relating to two or more of the identified second plurality of combination offers to the user device user for simultaneous display by the user device, wherein, when transmitting the information relating to two or more of the identified second plurality of combination offers, the service provider is further to:
provide a plurality of images corresponding to each of the two or more of the identified second plurality of combination offers, wherein each image of the plurality of images corresponding to a particular combination offer of the two or more of the identified second plurality of combinations offers corresponds to a channel available with the particular combination offer,
wherein the plurality of images are displayed in a dynamic manner, in which each displayed image is periodically replaced by another image from the plurality of images;
receive a user request to purchase a selected combination offer of the identified second plurality of combination offers; and
provide, in response to receiving the user request to purchase the selected combination offer, a purchase confirmation that includes information associated with the selected combination offer;
wherein the user device is to:
receive a user request to display the channel;
forward the request to the service provider;
receive the information relating to the identified second plurality combination offers from the service provider; and
output a graphical user interface for graphically displaying the images corresponding to each of the identified second plurality of combination offers and the purchase confirmation.

12. The system of claim 11, wherein the customer information further comprises one or more of: viewing history information or order history information.

13. The system of claim 11, wherein the marketing rules comprise sets of combination offers and customer information criteria, and wherein the service provider is further to:
compare the customer information criteria for the marketing rules to the obtained customer information; and
identify the second plurality of combination offers for transmitting to the user device when the customer information criteria associated with marketing rules matches the obtained customer information.

14. The system of claim 11, wherein the service provider is further to:
generate ranking information for the identified second plurality of combination offers based on a cost impact to a user associated with the user device; and
transmit the ranking information to the user device with the information relating to one or more of the identified second plurality of combination offers based on the ranking.

15. The system of claim 14, wherein ranking the second plurality of combination offers is further based on a likelihood that the user will select a particular combination offer, and
wherein ranking the second plurality of combination offers is based on at least one of the customer information or the marketing rules.

16. The system of claim 11, wherein the service provider comprises:
a data center;
a regional office; and
a local office,
wherein the data center is to:
store the customer information and the marketing rules;
identify the second plurality of combination offers; and
transmit information relating to the identified second plurality of combination offers to the regional office,
wherein the regional office is to forward the information relating to the identified second plurality of combination offers to the local office, and
wherein the local office is to forward the information relating to the identified second plurality of combination offers to the user device.

17. The system of claim 16, wherein the user device is to generate the graphical user interface based on the received information and graphics stored by the regional office.

18. The system of claim 11, wherein the graphical user interface enables user navigation between respective ones of the identified second plurality of combination offers.

19. A non-transitory computer-readable medium having stored thereon sequences of instructions which, when executed by at least one processor, cause the at least one processor to:
receive, from a set-top box (STB), a user request to view a broadcast or cable television channel to which the user does not currently subscribe;
provide, to the STB, and in response to receiving the user request, an image or video corresponding to the broadcast or the cable television channel and an option to subscribe to the broadcast or cable television channel;
obtain, from a first database, customer information regarding the user,
wherein the customer information comprises at least prior offer information and prior trial period data;
obtain, from a second database, marketing rules regarding a plurality of combination offers;
determine a number of combination offers from the plurality of combination offers based on the customer information and the marketing rules;
provide, to the STB, two or more of the determined combination offers for simultaneous display by the STB, wherein, when causing the at least one processor to provide the two or more of the determined combination offers, the instructions further cause the processor to:

provide a plurality of images corresponding to each of the two or more of the determined combination offers, wherein each image of the plurality of images corresponding to a particular combination offer of the two or more of the determined combinations offers corresponds to a channel available in the particular combination offer, wherein the plurality of images are displayed in a dynamic manner, in which each displayed image is periodically replaced by another image from the plurality of images;

receive, at the server and from the STB, a user request to purchase a selected one of the one or more provided combination offers;

provide, to the STB, in response to receiving the user request to purchase the selected combination offer, a purchase confirmation that includes information associated with the selected combination offer; and provision channels included within the selected combination offer.

20. The non-transitory computer-readable medium of claim 19, wherein the customer information further comprises one or more of: demographics information, profile information, preferences information, viewing history information, order history information, or prior offer information, wherein the marketing rules comprise sets of combination offers and customer information criteria, and wherein the instructions further cause the at least one processor to:

compare, for each of the marketing rules, the customer information criteria to the obtained customer information; and identify combination offers associated with marketing rules for providing to the user in which the customer information criteria matches the obtained customer information.

\* \* \* \* \*